United States Patent [19]

Macklem

[11] 3,994,807

[45] Nov. 30, 1976

[54] METHOD AND MEANS FOR PURIFYING WATER IN AN AQUARIUM TANK

[76] Inventor: F. Sutherland Macklem, 468 S. Main St., New Canaan, Conn. 06840

[22] Filed: May 1, 1975

[21] Appl. No.: 573,532

Related U.S. Application Data

[63] Continuation of Ser. No. 459,420, April 8, 1974, abandoned, which is a continuation-in-part of Ser. No. 262,152, July 12, 1972, abandoned.

[52] U.S. Cl. .............................. 210/63 R; 210/70; 210/83; 210/169; 210/513
[51] Int. Cl.² ........................ C02B 1/34; E04H 3/20
[58] Field of Search ............ 210/74, 169, 194, 196, 210/197, 455, 513, 63, 70, 83

[56] References Cited
UNITED STATES PATENTS

| | | | |
|---|---|---|---|
| 2,672,845 | 3/1954 | Schneithorst ................... | 210/169 X |
| 2,744,065 | 5/1956 | Lacey ................... | 210/169 |
| 3,006,476 | 10/1961 | Halpert ................... | 210/169 |
| 3,688,907 | 9/1972 | Pravec ................... | 210/169 |
| 3,722,685 | 3/1973 | Olensten et al. ................... | 210/169 |
| 3,768,651 | 10/1973 | Streeter ................... | 210/169 |
| 3,768,652 | 10/1973 | Jardin ................... | 210/169 |

Primary Examiner—Theodore A. Granger
Attorney, Agent, or Firm—Hopgood, Calimafde, Kalil, Blaustein & Lieberman

[57] ABSTRACT

An aquarium water-clarifying system is disclosed in which water at one location from near the tank bottom or gravel is raised through a first tube into a container to an accumulated level above water level in the tank; such raised water is transiently retained for water-surface air exposure in the container, and air-laden surface water from the container is then returned to the tank through a second return tube that also terminates near the tank bottom. The lower ends of both tubes are spaced from each other and give rise to a gentle circulation or sweep of primarily the stratum near the tank bottom, using only the air-laden surface water from the container. Under controlled conditions, in one embodiment, the return flow of such air-laden water may contain an intermittent stream of air bubbles.

20 Claims, 4 Drawing Figures

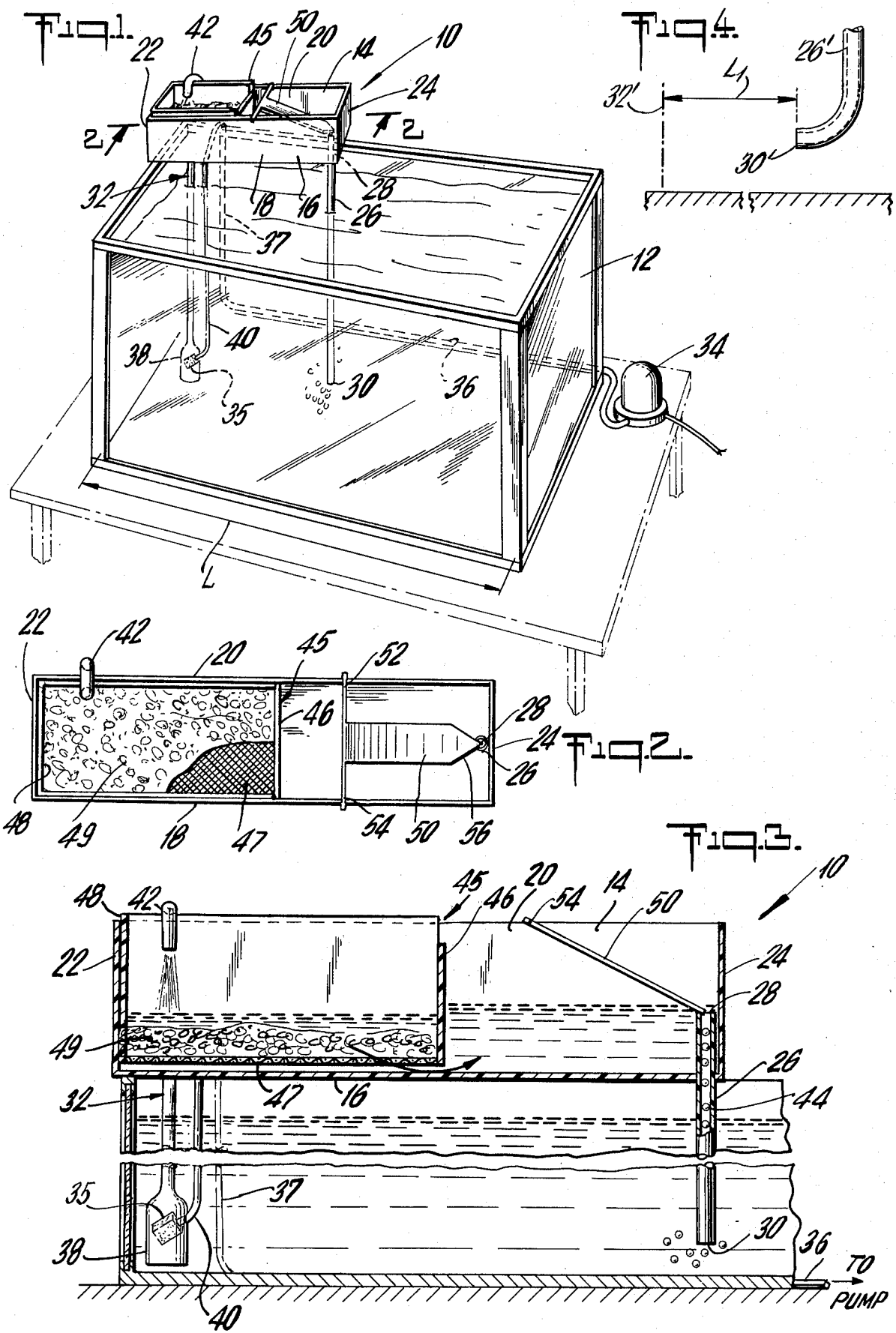

METHOD AND MEANS FOR PURIFYING WATER IN AN AQUARIUM TANK

The application is a continuation of my earlier application Ser. No. 459,420, filed Apr. 8, 1974, and said earlier application is a continuation-in-part of my original application, Ser. No. 262,152, filed July 12, 1972; both said earlier application and said original application are now abandoned.

The present invention relates generally to aquariums, and more particularly to an inexpensive, efficient and decorative system for clarifying or purifying the water in the aquarium.

The maintaining of a tropical fish aquarium in the home is an activity that provides pleasure and education for countless numbers of adults and children. In order to maintain the fish and aquarium plants in an optimum environment, the water in the aquarium tank should be periodically cleaned, aerated and degassed to replenish the oxygen content of the tank water. In addition, the gravel at the tank bottom is preferably cleaned periodically to remove excreta and other wastes produced by the fish that collects at the bottom of the tank.

Conventional aquarium filters employ a water pump to pump water from the tank into the filter and then from the filter back into the tank. A conventional aquarium filter is hung over the side or back wall of the tank such that the water in the filter is at the same level as in the tank. Water is transferred from the tank to the filter by means of a siphon tube and the filter water is pumped back into the tank, tending to lower the water level in the filter which, however, is compensated for by the introduction of new tank water into the filter by the siphon tube. In the conventional filter, the tank water transferred to the filter is obtained from the top of the tank, and, moreover, the filtered water is returned to the top of the aquarium. Accordingly, water at the tank bottom, at which most of the waste is collected, is hardly filtered and cleared.

In the conventional aquarium filter, water is transferred out of the filter at a relatively high rate, commonly between 60 and 150 gallons per hour, thus requiring the use of a relatively large and expensive pump. Even with the use of water pumps of this capacity, the tank bottoms of aquariums are often not adequately cleaned requiring the owner to periodically vacuum the tank bottom to remove the remaining bottom waste.

Conventional tank filtering equipment is relatively complex and expensive and subject to maintenance operating problems. In addition, the commonly employed filters and associated water pumping apparatus are bulky and detract from the overall appearance of the aquarium despite frequent attempts to integrate the filter into the overall aquarium design.

It is an object of the invention to provide more efficient and complete filtering and cleaning of the tank bottom while requiring a lower capacity and hence less expensive pump.

It is another object of the invention to provide an improved, more efficient, and less expensive aquarium filter.

In accordance with the present invention, water from the tank bottom is transferred through a first or lift tube into a container which may contain filter material but which in fact provides surface-air exposure for accumulated water, at a level above tank water level. The lower end of that tube extends into the aquarium tank and terminates just above or at the level of the gravel or sediment at the bottom of the tank. Filtered water, or in any event, air-laden surface water, is returned to the tank through a second or return tube, the lower end of which also terminates near the tank bottom. It has been found that by the use of this construction, essentially only the lower stratum of tank water is served by the water circulation path, and that more effective clarification of the tank water is achieved with the use of a relatively low capacity and inexpensive water pump, because the stratum most in need of clarification is the one which is primarily served by the filter, and gravity separation of sediment in adjacent regions of the tank can proceed undisturbed by the sweep action of the discharged air-laden water.

In one embodiment of the invention that is herein shown, water from the tank bottom is transferred or lifted into the filter container by causing air bubbles to be injected into the open lower end of the lift tube, to cause water from the tank bottom to flow up the lift tube and into the container.

In another aspect of the invention, water from the tank is transferred into the trough at a controlled rate to a level slightly higher than the upper end of the return tube to cause the water returning to the tank bottom to contain an intermittent stream of air bubbles. The intermittent air bubble stream produced in this manner is highly decorative, but, perhaps more significantly, also provides high effective aeration and degassing of the water in the tank, and enhances a bottom sweeping action to cleanse the tank gravel and prevent the settlement of fine sediment at the bottom of the tank.

To the accomplishment of the above and to such further objects as may hereinafter appear, the present invention relates to an aquarium filter, substantially as defined in the appended claims and as described in the following specification taken together with the accompanying drawings in which:

FIG. 1 is a perspective of an aquarium incorporating the filter of the invention as shown in typical application;

FIG. 2 is a vertical cross-section taken along the line 2—2 of FIG. 1;

FIG. 3 is a plan view of the filter of the invention; and

FIG. 4 is a simplified fragmentary view to illustrate a modification.

Referring now to the embodiment of the invention illustrated in the drawing, FIG. 1 illustrates the aquarium filter of the invention generally designated 10 as used in conjunction with an aquarium tank 12. Filter 10 includes a trough or container 14 shown supported on one corner of the tank 12 such that the bottom of the container is about one-half inch above the water level in the tank.

Container 14, which is preferably made of an inert plastic such as acrylic, styrene, or butyrate, includes a bottom wall 16, side walls 18 and 20, and end walls 22 and 24. An air descent tube 26 has an open upper end 28 extending into trough 14 and open lower end 30 terminating near (2 inches or less from) the gravel or other bottom surface of the tank. As will be described, the container and tube constitute a filter and degasser for the water in the aquarium, and may, if desired, also establish a highly attractive effect by providing an intermittent flow of air bubbles into the aquarium.

Water from the bottom of the tank is raised into container 14 through an air lift tube 32 which has an upper end communicating with the interior of container 14 and a lower end terminating in the interior of the tank at a position near, that is, ½ inch or less, above the gravel or other bottom surface of the tank.

As herein shown, water from the tank bottom is raised through tube 32 by injecting air into the lower end of that tube. To this end, air is injected into the lower end of tube 32 by means of a vibrator-type aquarium air pump 34 located external of the tank. An air line 36 extends from pump 34 at the rear of the tank 12, and has a vertical section 37 extending over the left corner of the tank (as viewed in FIG. 1), and then through a vertical section 40 which turns up into the lower end 38 of air lift tube 32. The latter has an end portion 42 that curls over side wall 20 of the container.

Air pumped through air line 36 by pump 34 is injected into the lower end 38 of air lift tube 32. The thus-formed air bubbles rising in air lift 32 carry water up that tube and into the interior of trough 14. The amount of aquarium water transferred into the trough in this manner is determined by the capacity of pump 34. The air bubbles for raising the water at the tank bottom to the container may also be obtained through a porous element commonly known as an air diffuser or stone 35, shown in broken lines in FIG. 1, which at least in part is located within the lower end of the air-lift tube which would be enlarged to receive the air stone. The tank water is then raised or siphoned into container 14 and is filtered therein, as more specifically described in a later part of the application, and returned to the bottom of the tank through tube 26.

In another aspect of the invention, the return flow of water may contain an intermittently formed, decorative stream of air bubbles. To this end, water from tank 12 is pumped into the container at a predetermined rate, which may be, for example, 10 gallons per hour. The water then rises in the container to the level of the upper end of tube 26. The water in the container rises slightly higher than the tube and closes over the top of the tube, trapping all or most of the column of air formed in that portion of the tube that is above the surface of the tank water. The water in the container rises still higher to force its way down the tube, pushing the long air column or bubble down ahead of it. This initial air bubble greatly impedes the outflow of water down the tube so that the water in the trough rises considerably above the level of the top of the tube.

When the initial air bubble escapes from the bottom of the tube, the outflow of water down the tube is no longer impeded and the water level in the trough now begins to fall back down toward the level of the top of the tube. As the level approaches that of the top of the tube, a vortex forms and sucks air into the tube forming a bubble which stops the vortex sucking more air momentarily. The blockage then relaxes and another bubble forms, blocks, then another, and so on, thus forming a string of bubbles that are swept down the tube with the downflowing water.

The string of bubbles in the tube is an impediment to the downflow of the water. Thus, when the string of bubbles is long enough, it will sufficiently block the downflow of water to cause the water level in the container to rise until the vortex closes, and no more bubbles are formed. This blockage is relaxed when the bubbles leave the end of the tube, at which time the water level in the trough quickly falls and the vortex action is repeated.

If the rate of flow of water into the container is too low, the water will simply dribble over the top edge of tube 26 and fall back into the tank, trapping no air and forming no bubbles. If the rate of flow is too great, then the water will rise far above the top of the tube, until the pressure is sufficient that the water is flowing out down the tube at the same rate as it is coming in, at which point the water level will stabilize, that is, it will not drop back but will remain high above the top of the outlet of tube 26.

As a result of the establishment of a correct flow rate, an intermittent stream of air bubbles 44 is formed within and flows downwards through tube 26 and into the aquarium. These bubbles aid in the aeration and degassing of the tank water by creating upward currents which cause water from the tank bottom to gently circulate up to the upper surface of the tank where it comes into contact with the air. The air bubbles also generate a pulsating current of water at the bottom of the tank that enhances the sweeping action that serves to assist in the cleaning of the bottom of the tank.

In another aspect of the invention the filter section is contained in a box-like unit 45 which is removably inserted into container 14. Unit 45 includes an end wall 46 which, when the unit is placed in the container in the manner shown in FIGS. 1-3, extends about midway along the length of the container. The lower end of wall 46 is positioned about ⅛ inch from the bottom wall of the container, and the top edge of wall 46 terminates about one quarter inch below the upper edge of the container side walls. A screen or mesh 47 extends between the lower end of wall 46 and an opposing end wall 48 of unit 45, and a quantity of filtering material 49, such as plastic wool or glass wool to which activated charcoal or other purifying material is added, is placed over screen 47.

In operation, the tank water pumped into the container passes from tube section 42 through filter material 49 and screen 47, and then normally passes beneath the lower end of partition wall 46 into the section of container 14 surrounding the upper end of tube 26. As the filter material 49 and screen 47 gradually fill or clog with dirt or waste from the tank water, greater water pressure is required to pass the water through the filter material thereby increasing the water level in the filter section, that is, above screen 47. As the filter material and screen continue to fill with dirt particles, the water level in the filter section eventually rises to the top of the partition and at that time flows over (rather than under) the partition. When this occurs, the aquarium owner is advised that the filter is excessively clogged and should be replaced. In this manner, the partition acts as an automatic "signal" for monitoring the filter section.

The formation of the intermittent stream of air bubbles in tube 26, as described above, requires a sufficient — although not excessive — flow of tank water into the trough. In cases where the cost of a pump such as pump 32 required to produce a sufficient flow of tank water is excessive, a less expensive and lower capacity pump may be employed by the use of a control element 50, which facilitates the formation of air bubbles within tube 26 under reduced flow-rate conditions.

As illustrated in FIGS. 2 and 3, control element 50 is in the form of a rectangular plate having arms 52 and 54 extending from one end thereof and resting respectively on container side walls 20 and 22. The other end of element 50 is in the form of triangular section 56, the apex of which rests on the open upper end 28 of air tube 26. It has been found that the arrangement of element 50 in this manner, with the pointed end positioned above the upper end of air tube 26, enables the formation of the bubble streams in that tube under widely varying operating conditions, such as at reduced water flow rates, thereby increasing the flexibility of use of the filter. Moreover, as arms 52 and 54 can be slid longitudinally along the trough walls, the position of the apex of the control element at the air tube open end can be varied to achieve optimum formation of the bubble stream.

In a typical application of the aquarium filter of the invention, the tank was 12 inches in depth, and the container was 2 inches wide, 2½ inches deep, and 10½ inches long. The air tube 26 had an outer diameter of 5/16 inches and an inner diameter of ¼ inch and was 11 inches long. The air tube extended upwards about one inch into the container and was located at one end of the container and may actually touch the end wall. It is to be understood that these dimensions are only typical of an operative filter system and are not intended to limit the scope of the invention.

The filter of the invention has been found to achieve complete and thorough cleaning of the tank bottom, by the use of a relatively low capacity (e.g., 10 gallons per hour) and inexpensive pump, in contrast to the high capacity (60 to 150 gallons per hour) pumps required for use in the conventional aquarium filters. By transferring and filtering water from the bottom stratum, i.e., substantially only near the tank bottom and returning the filtered water to such stratum, i.e., to the tank bottom, bottom water currents are established that further facilitate the cleaning of the tank water. This stratum-cleaning effect is obtained even for flow rates which do not involve air-drop entrainment in the descent tube 26.

The intermittent bubble streams that may be formed in the filter of the invention, besides adding to the enjoyment of the aquarium by enhancing the appearance of the tank and providing an additional visual effect, also enhance the aeration and degassing of the tank water and increase the sweeping and cleansing action at the tank bottom.

Further improvements may be made in the invention to achieve other visual and filtering effects. For example, tube 26 may be in the form of a helix such that the air bubbles drop into the tank as if they were descending a spiral staircase. In addition, the bottom of the drop tube may be bent so as to direct the filtered water (with or without entrained air bubbles) across the gravel at the tank bottom in a desired manner or direction. A telescoping extension tube may also be added to the air lift and drop tubes to allow the filtering tubes to be employed for tanks having different depths.

FIG. 4 illustrates the modification wherein the descent tube 26' includes an elbow or 90° bend at its lower end 30', the same being directed to discharge generally horizontally and in the general longitudinal direction of the ascent-tube axis 32'. Preferably, the descent-tube diameter is slightly less than that of the ascent tube 32', and the horizontal distance $L_1$ from discharge at 30' to pick up at the bottom end of tube 32' is at least one third of the longitudinal extent L of the tank; also, preferably, the discharge at 30' is at an elevation above soiled-water induction at the lower end of tube 32', as for example at 1 to 1.5 inches from the bottom, and less than 0.5 inch from the bottom, respectively.

If the intermittent formation of the air bubbles in tube 26 is desired, the filter container 14 should be mounted above the aquarium tank, although it may, if the formation of the bubble stream is not desired, be mounted in the manner of a conventional outside filter in which the filter is hung to the side of the tank and the water level in the filter is at about the same level as in the tank. In addition, to facilitate the removal of a clogged filter from the container, the filter material screen and transverse wall may be, as herein shown, combined in a single replaceable unit which can be readily removed from the filter container and replaced with a new, clean unit, whenever the filter material in that unit becomes clogged. This condition is indicated to the aquarium owner by the water flowing over the unit end wall into the adjacent section of the container.

Thus while the aquarium filter of the invention has been herein described with respect to several embodiments, it will be apparent that modifications may be made therein, all without departing from the spirit and scope of the invention.

What is claimed is:

1. Apparatus for purifying the water of an aquarium comprising in combination, an aquarium tank with a bottom, sidewalls and an air-exposed top, a tray with a bottom, sidewalls, and an air-exposed top, said tray being constructed and arranged to be supported by the upper edge of the tank sidewalls and at least partially located over the top of the aquarium tank, a water-inlet tube in combination with air-lift means located within said tank adjacent a sidewall thereof and with a first open end adjacent the tank bottom, a second open end of said tube being constructed and arranged to discharge pumped water into said tray, water-discharge means for said tray comprising a conduit having a first open end extending upwardly within said tray and above the bottom of said tray to a level beneath the upper edge of the sidewalls of said tray, said conduit also extending downwardly from said first open end and having a second open end spaced above but adjacent the bottom of said tank, the second open end of said discharge conduit being spaced from the first open end of said water-inlet tube to the extent of 50% or less of the length of the tank, whereby a small section of the bottom region of the aquarium tank between said discharge conduit and said inlet tube is swept by fluid discharged from the discharge conduit without disturbing gravity separation of sediment in adjacent regions of the aquarium, such fluid being air-laden surface water from said tray.

2. In an aquarium system, including an aquarium tank having a bottom and sidewalls, a system for clarifying water in the tank and for enhancing the appearance of the aquarium, said system comprising a container having a bottom wall and sidewalls, said container being constructed and arranged to be supported adjacent a portion of the tank sidewalls and above the level of water in the tank, an ascent tube and a descent tube having lower open ends positioned near the bottom of the tank and at a longitudinal spacing from each other to the extent of no more than substantially 50% of the length of said tank, air-lift pump means associated with said ascent tube for drawing water from a lower stratum of said tank and discharging the same into said container, said descent tube having an open upper end terminating within said container and above the bottom thereof, said container being constructed and arranged to contain a supply of water to a level determined only by the upper end of said descent tube, to thereby cause only air-laden surface water from said container to flow downwardly in said descent tube for lower-stratum release of air-laden water into said tank only at the lower stratum, whereby a relatively small section of the lower stratum of the aquarium tank between the lower ends of said tubes is swept by fluid discharged from the descent tube without disturbing gravity separation of sediment in adjacent regions of the aquarium.

3. The aquarium filter of claim 2, in which said ascent tube terminates no more than ½ inch from the aquarium tank bottom, and said descent tube terminates no more than 2 inches from the aquarium tank bottom.

4. The aquarium system of claim 2, further comprising a transverse spillway wall located between the region of ascent-tube discharge and the upper end of the descent tube, the spillway portion of said transverse wall being at an elevation between the upper end of said descent tube and the upper edge of the container sidewalls.

5. The aquarium system of claim 4, wherein filter material is retained in the container region on the ascent-tube side of said spillway wall.

6. The aquarium filter of claim 2, in which the lower end of said descent tube discharges primarily in the general horizontal direction of said ascent tube.

7. The aquarium filter of claim 6, in which said descent tube includes a substantially 90° bend at its discharge end.

8. The aquarium filter of claim 6, in which said descent tube includes an elbow at its discharge end.

9. The aquarium system of claim 2, further comprising a control member supported at one of its ends on the side walls of said container and having an opposite pointed end resting on the upper end of said descent tube.

10. The aquarium filter of claim 2, in which the lower end of said ascent tube is at least as low as the lower end of said descent tube.

11. The aquarium filter of claim 2, in which said tank is of generally rectangular planform, the lower ends of said descent and ascent tubes being fixedly spaced in the generally longitudinal direction of said tank at least to the extent of one third of the longitudinal extent of said tank.

12. In an aquarium system including an aquarium tank having a bottom and side walls, a system for clarifying the water in the aquarium tank providing for clarification of said water by sweeping with air-laden water primarily the stratum near the tank bottom, said system comprising:

1. an ascent tube with an inlet end opening within said aquarium tank and an outlet end in fluid communication with a container having a bottom and side walls, said inlet end being located above and near the bottom of said aquarium;

2. pump means for causing the flow of liquid from said inlet end to said outlet end off said ascent tube;

3. a descent tube for air-laden surface water drawn from said container, said descent tube having an outlet end located above and adjacent the bottom of said aquarium and in spaced relation to the inlet opening of said ascent tube, said descent tube extending upwardly in a generally vertical direction from said descent tube outlet end to an open upper end which is at an elevation within the volume subtended by said container side walls to provide an inlet end to said descent tube located within said container and above the bottom wall thereof, the pump flow rate being less than the flow-handling capacity of the inlet to said descent tube, whereby air-laden surface liquid in said container is intermittently discharged downwardly through said descent tube because of periodic overflow and entraps air in said liquid discharging said air at the outlet end of said descent tube to impart a gentle modulation of a sweep action in the body of liquid in the aquarium in addition to that caused by said pump means solely, said sweep circulation being primarily in the stratum near the tank bottom and improving the clarification of the body of liquid within the aquarium without disturbing gravity separation of sediment in the adjacent regions of the aquarium.

13. The aquarium filter of claim 12, in which said tube spacing is no more than at least substantially one half the longitudinal extent of said tank.

14. The method of clarifying water in an aquarium tank having a bottom and sidewalls, said method comprising the steps of:

a. providing a container having a bottom wall and sidewalls, said container being constructed and arranged to be supported adjacent a portion of the tank sidewalls and above the level of water in the tank;

b. providing an ascent tube and a descent tube having lower open ends positioned near the bottom of the tank and at a longitudinal spacing from each other to the extent of no more than substantially 50% of the length of said tank, said ascent tube having air-lift pump means associated therewith for drawing water from a lower stratum of the tank and discharging the same into said container, said descent tube having an open upper end terminating within said container and above the bottom thereof, said container being constructed and arranged to contain a supply of water to a level determined only by the upper end of said descent tube, to thereby cause only air-laden surface water from said container to flow downwardly in said descent tube for lower-stratum release of air-laden water into said tank only at the lower stratum;

c. so regulating the rate of fluid flow discharged by said ascent tube as to be substantially equal to the capacity of said descent tube to draw air-laden surface water from said container for sweep discharge at the lower stratum of the tank, whereby the tank level remains constant and a substantially continuous supply of air-laden container-surface water is discharged by said descent tube.

15. The method according to claim 14, in which discharge of air-laden water at the lower open end of said descent tube is generally horizontally directional in the direction of said ascent tube.

16. The method of claim 14, in which the rate of in said ascent tube is related to the effective volumetric capacity of the tank such that a volume of water equal to said tank capacity is pumped only substantially once in one or more hours.

17. The method of claim 14, in which air bubbles are added to the air-laden surface water product for discharge therewith near the tank bottom, whereby bubbles rising from the location of discharge near the tank bottom establish a component of water-circulation force in the direction opposite to that attributable to the water component of such discharge, thereby enhancing the confinement of water flow to said bottom stratum.

18. The method of clarifying water in an aquarium tank having a bottom and sidewalls, said method comprising the steps of:
   a. providing a container having a bottom wall and sidewalls, said container being constructed and arranged to be supported adjacent a portion of the tank sidewalls and above the level of water in the tank;
   b. providing an ascent tube and a descent tube having lower open ends positioned near the bottom of the tank and at a longitudinal spacing from each other to the extent of no more than substantially 50% of the length of said tank said ascent tube having air-lift pump means associated therewith for drawing water from a lower stratum of the tank and discharging the same into said container, said descent tube having an open upper end terminating within said container and above the bottom thereof, said container being constructed and arranged to contain a supply of water to a level determined only by the upper end of said descent tube, to thereby cause only air-laden surface water from said container to flow downwardly in said descent tube for lower-stratum release of air-laden water into said tank only at the lower stratum;
   c. so regulating the rate of fluid flow discharged by said ascent tube as to be less than the capacity of said descent tube to draw air-laden surface water from said container, whereby the tank level remains constant and steady but substantially intermittent flow is discharged at the lower stratum of the tank by reason of periodic air-bubble development in the water discharge of said descent tube.

19. The method of claim 18, in which discharge of air-laden water at the lower end of said descent tube is generally horizontally directional in the direction of said ascent tube.

20. The method of claim 18, in which the rate of flow in said ascent tube is related to the effective volumetric capacity of the tank such that a volume of water equal to said tank capacity is pumped only substantially once in 1 or more hours.

* * * * *